July 30, 1968  P. G. HUNTER ETAL  3,394,923
VIBRATORS

Filed Sept. 6, 1966  2 Sheets-Sheet 1

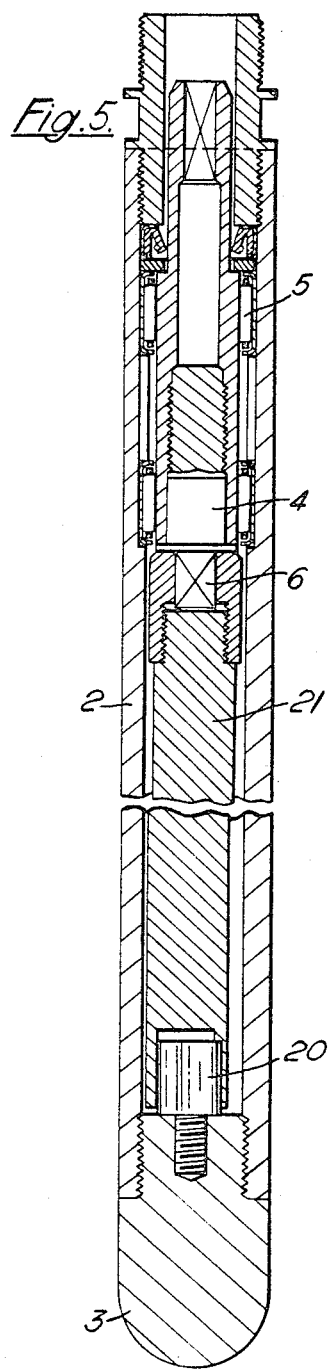
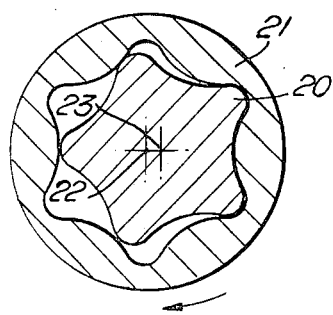

United States Patent Office 3,394,923
Patented July 30, 1968

3,394,923
VIBRATORS
Percy George Hunter, New Malden, Leslie Vivian Chandler, Surbiton, Clive Bromly Hunter, Shepperton, and Martin Donald Murray, Woking, England, assignors to Fyne Machinery & Engineering Limited, London, England, a corporation of Great Britain
Filed Sept. 6, 1966, Ser. No. 577,542
Claims priority, application Great Britain, Sept. 15, 1965, 39,445/65; Sept. 29, 1965, 41,380/65
7 Claims. (Cl. 259—1)

ABSTRACT OF THE DISCLOSURE

An immersion vibrator comprises a rotor housed in a casing, the rotor and casing mutually engaging by ribs or lobes on one cooperating with channels or recesses on the other, and the transverse dimensions of the engaging parts of the rotor and casing being selected to ensure that throughout a complete gyration the ribs or lobes all maintain, by varying points of their surfaces, contact with the channelled or recessed surface, in order to ensure a true mutual rolling action without slip or disengagement.

---

This invention relates to vibrators comprising a body rotatable eccentrically in an outer casing.

One use for a vibrator of this kind is in a device for either immersion or surface vibration of concrete mixes in order to agitate or compact the mix with the object of consolidation to a voidless state.

Vibrators of the aforesaid kind are also used for other industrial purposes, e.g. for causing vibrations in conveyors, screen, hoppers or the like, and the invention is applicable to vibrators used for all such purposes.

It is frequently desired to generate high frequency vibrations, and the rotatable body has, in known vibrators, been combined with frequency-amplifying means. Devices of this kind have included the provision at one end of the rotatable member a body of circular cross-section which rolls in a hollow bearing of larger circular cross-section. These have several disadvantages. They frequently require tapping to introduce the tractive friction to start, and are prone to slip if any other than dry clean conditions exist inside the casing. In consequence they necessarily depend upon efficient seals between the lubricated drive member and the interior of the casing required to be dry. These defects increase as the vibrator is put to use. Attempts to overcome these disadvantages have been known to include the provision at one end of the rotatable body of a projection having a cross-section of a regular geometric figure which rides in a hollow bearing inside the outer casing which has a cross-section of a different regular geometric figure. The number of sides or faces of the projection has usually been one less than the number of sides or faces of the hollow bearing into which it projects. Thus for example a substantially triangular-sectioned projection has fitted into a square hollow bearing. The comparatively sharp edges of the projection having a cross-section of a regular geometric figure soon begin to wear, and increase of slip, and also of the heat and noise generated, is noted.

The object of the present invention is to provide a vibrator incorporating means for ensuring positive commencement of vibration and elimination of any slip during operation, thus ensuring positive vibration frequency and positive relationship between driven speed and gyrations of the rotating body.

With this end in view the invention consists in a vibrator comprising a mass rotatable out of balance in a casing, wherein the said mass and casing, at rest and during relative movement maintain a cooperative engagement with one another by a plurality of ribs or lobs on one of them intermeshing with a different number of channels or recesses in the other, the surfaces of the said ribs or lobes being formed with smooth continuous curves of comparatively large radius of curvature.

Conveniently in a vibrator according to the invention, a part of or an attachment to the rotatable mass or the casing is formed with a plurality of ribs or lobes adapted to cooperate with a different number of channels or recesses in the casing or the rotatable mass respectively, the surfaces of the said ribs or lobes being formed with smooth continuous curves of comparatively large radius of curvature.

The channels or recesses with which the ribs or lobes cooperate may also be formed with smooth continuously curved surfaces of comparatively large radius of curvature. In consequence of this shaping of the said cooperating surfaces, they roll upon one another as the rotatable body is caused to gyrate in the casing. Furthermore the lateral dimensions of the cooperating parts are selected to ensure continuous contact between them at a plurality of points round their peripheries throughout each complete cycle (although, of course, the actual points of contact will vary during each cycle).

It is found that a vibrator fitted with the cooperating bearing surfaces indicated above is positive in operation. The rotor is free from slip, and as soon as driven it engages with the casing and breaks into gyrations. By virtue of the rolling form of the coacting surfaces they suffer negligible wear, and the noise and heat generated are reduced to acceptable limits.

The invention will be clearly understood from the following description of one form (given, however, merely by way of example) which it may assume, and this description will be more readily followed by reference to the accompanying drawings wherein:

FIGURE 5 represents in axial section another form of a vibrator in accordance with this invention; and FIGURE 6 represents a cross-section of the engaging parts of the rotor and stator in the vibrator shown in FIGURE 5.

Figure 1:
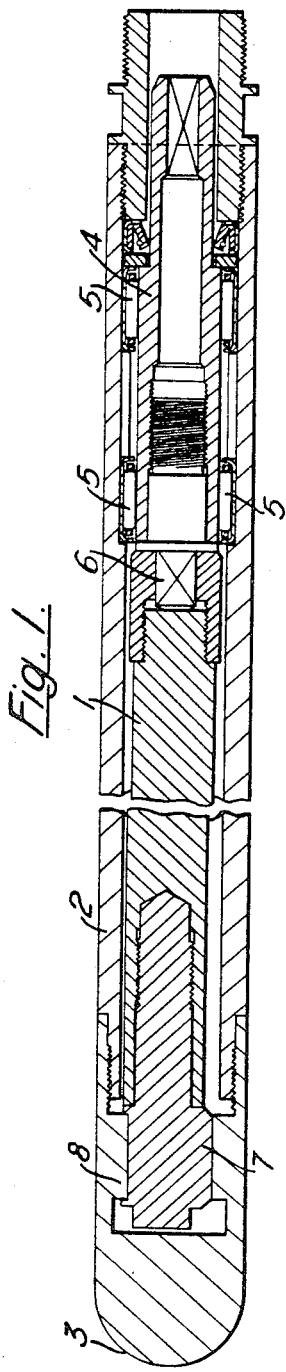
FIGURE 1 represents in axial section an immersion vibrator incorporating the present invention.

In carrying the invention into effect in one convenient manner, as shown in FIGURE 1 of the aforesaid drawings an immersion vibrator comprises a cylindrical rotor 1, housed in the body 2 of a casing fitted with a nose 3. A drive member 4 rotatable in the casing body 2 in roller bearings 5 is connected to one end of the rotor 1 by a universal type coupling 6. The drive member 4 may be connected by a flexible driving shaft (not shown) to an external motor.

Figure 4:
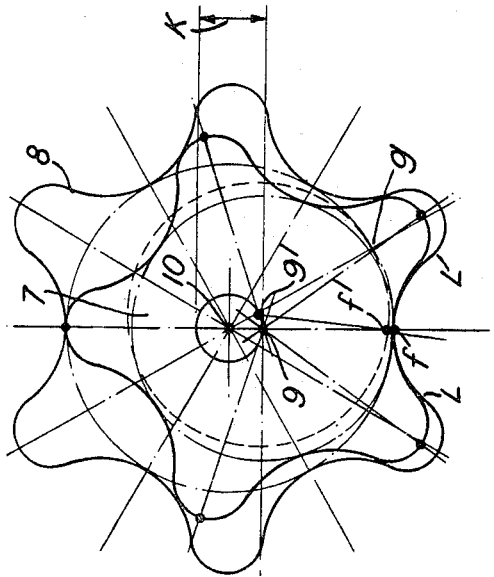
FIGURES 2, 3 and 4 are diagrams representing development of the cooperating bearing surfaces of the rotor and casing in the vibrator shown in FIGURE 1.

To the other end of the rotor 1 is screwed a rotor head or bearing member 7 adapted to cooperate with a ring bearing 8 formed in, or attached inside the nose 3 of the casing. Preferred shapes of the member 7 and the ring bearing surface 8 will be described in detail hereinafter but in whatever form it is used, the surface of the member 7 is provided with a plurality of longitudinal ribs or lobes equispaced round its surface, and the ring surface 8 is provided with a different number of longitudinal channels or recesses to cooperate with the ribs or lobes of the member 7. Preferably the number of channels or recesses will be one more than the number of ribs or lobes. A preferred arrangement and shaping of the cooperating surfaces of the members 7 and 8 is represented in FIGURE 4 of the aforesaid drawings as a section through the members 7 and 8 in a plane perpendicular to the rotor axis, the member 7 being formed with five lobes to cooperate with six channels in the surface of the surrounding ring 8. As an important feature of the invention it will be noted that the tips of the lobes and the bases of the recesses are smoothly curved surfaces of comparatively large radii of curvature, and the surface areas between adjacent lobes or channels are also smoothly curved and each of comparatively large radius of curvature. There is therefore no discontinuity in the sinuous surfaces of the members 7 and 8. It will also be noticed from FIGURE 4 that the dimensions of the member 7 and ring 8 are selected so that their respective surfaces are in contact at a plurality of points, and as will appear hereinafter remain in contact at a plurality of points during each complete gyration of the member 7 and the ring 8. While arrangements may be employed in which the member 7 has a different number of lobes, and the ring 8 a different number of channels, these principles of smooth, continuous cooperating surfaces, and multi-point contact between them should be adhered to in all combinations.

Figure 3:
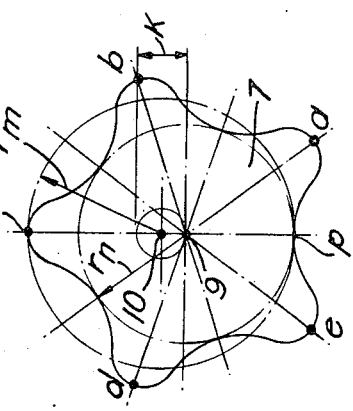
Figure 2:
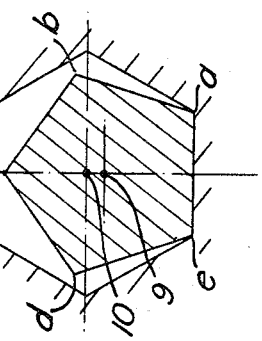

The principles of derivation of the forms of the cooperating surfaces shown in FIGURE 4 are illustrated in FIGURES 2–4, and will now be described.

It can be shown that the vibration frequency set up by the out-of-balance forces when the rotor is rotated is determined in accordance with the formula $$F = \frac{R \cdot Np}{Nr - Np}$$

where F is the vibration frequency:

R is the number of revolutions per minute of the driving shaft:

$Np$ is the number of lobes on member 7:

$Nr$ is the number of channels on the ring 8.

Thus five lobes cooperating with six channels, as in FIGURE 4, will provide a step-up amplification of 5:1 for the vibration frequency in relation to the rate of revolution of the drive member 4. A first approximation to arrangements for providing this step-up ratio might be conceived as a rotor of pentagonal cross-section housed in a stator of hexagonal cross-section, as shown in FIGURE 2, with the pentagon and hexagon having sides of equal width. The defects of such an arrangement become apparent upon consideration of FIGURE 2. At any given moment not more than two points, e.g. $a$ and $e$, of the rotor are in contact with the stator, and as the rotor turns about its axis only one point remains in contact. Slip between the surfaces cannot be prevented in this arrangement. Moreover the sharp discontinuous edges of the rotor soon wear, and the degree of likelihood of slip is increased. The flat surfaces of the rotor and stator make frequent impacts on one another, which aggravates wear and damage, and generates undesirable noise and heat. It can, moreover, be shown experimentally that to ensure positive mesh the axis 9 of the rotor should trace a truly circular path round the axis 10 of the stator, and this is clearly untrue of the arrangement shown in FIGURE 2.

The amplitude of transverse oscillations of the rotor during a complete gyratory cycle is twice the distance between the axes 9 and 10, when the rotor axis 9 follows a truly circular path round the stator axis 10, and bearing this in mind a shape of rotor meeting the aforesaid requirements can be geometrically developed.

Referring to FIGURE 3, the radius of the pitch circle of the rotor is $rn$, and the radius of the pitch circle of the stator $rm$, the amplitude of movement of the rotor 7 is called K. Firstly $rn$ is struck from the axis 9 of the rotor, and $rm$ from the axis 10 of the stator.

As the difference between the radii is $K/2$ they co-incide at the point P and are spaced by a distance K at the opposite end of the vertical axis. For the points $a$, $b$, $c$, $d$, and $e$ to be in contact with the stator at all times, we can take point $c$ as equivalent to the topmost point of the pentagon, corresponding with the point $c$ of the pentagon in FIGURE 2. From this we can insert points $a$, $b$, $d$, and $e$ on a circle of the same radius, viz. 9–c. Through each of the points $a$, $b$, $c$, $d$ and $e$ is struck an arc of a circle having its centre on the radius extending from the axis 9 through the respective point. Between neighbouring arcs is struck an inwardly curved arc, and the radii of these various arcs are selected to ensure that the concave arcs will join the arcs at $a$, $b$, $c$, $d$ and $e$ smoothly and without discontinuity, and that the concave arcs will all touch the circle of radius $rn$. The radius of the "tip" arcs at points $a$, $b$, $c$, $d$ and $e$ will normally be of a value between $K/2$ and $K$, and in this way a rotor 7 of shape shown in FIGURE 3 is developed.

The profile of the stator or ring 8, can be derived from the developed shape of the rotor. If we regard the pitch circle of the rotor as rolling without slip around inside the pitch circle of the stator, the lobes of the rotor may be regarded as forming the profile of the stator.

The motion may start with point $f$ (FIGURE 4) being the point of contact between stator and rotor. The rotor will be driven about its own axis 9 in a clockwise sense, which means that the rotor will gyrate about the axis 10 of the stator in a counterclockwise sense. As the rotor gyrates in this way point 9 will begin to move round the circular path of diameter K, and the point of contact will move away from point $f$. It is this varying point of contact that we have to plot as point 9 moves round the circle of diameter K in order to trace out the stator profile.

Moving the rotor pitch circle, by a rolling action in the stator pitch circle, through a selected small angle, the new point of contact between the rotor and stator can be found by drawing through the point 9, in its new, displaced, position 9', a line running to the point $f$ in its new position $f'$, and thereafter drawing through point $g$ a line parallel to the line 9'–$f'$. Where this parallel line intersects the profile of the rotor is a point on the stator profile. By identifying a series of such points there can be traced out a stator profile which will maintain continuous contact with the rotor throughout 360° rotations.

Continuous rolling contact by all lobes of the rotor with the stator is ensured by each of the six curves L—L extending to the last of the plotted points on this curve and then being smoothly connected by a reverse curve, as described, off the mid-axis of each recess. This "recess" curve conforms with the arc of the lobes but is not required as a rolling surface, and serves as a cavity for lubricant.

It will be noted from FIGURE 4 that in addition to the point of contact $f$ between rotor and stator, contact also occurs at a point of each lobe and the adjacent stator surface. As the rotor gyrates each lobe maintains contact (by a varying point) with the inner surface of the stator. It will also be noted that all cooperating surfaces, by virtue of their smooth curvature of comparatively large radius, move in rolling relationship, without slip or impact.

In consequence of these features the body 1, when set into motion by the drive member 4 immediately takes up the desired gyratory motion and generates vibrations of the desired frequency.

In a modified form of the invention shown in FIGURES 5 and 6 of the aforesaid drawings, a vibrator comprises a casing 2 with a nose 3, housing a drive member 4 running in roller bearings 5 and a coupling member 6, all as described above. Inside the casing is secured to the nose 3 a stator 20, and a cylindrical rotor 21 attached to the coupling 6 has a hollow lower end which surrounds the stator 20. The geometrical cross-section of the rotor and stator are substantially the same as those respectively of the stator and rotor described above with reference to FIGURES 1–4, and have channels and lobes, respectively, with surfaces of substantial radius of curvature, in order to ensure a rolling action, substantially without slip, when the rotor 21 is driven. The axis 22 of the hollow rotor 21, when driven, follows a circular path round the axis 23 of the solid stator 20.

It can be shown that the vibrator described above, with reference to FIGURES 5 and 6 when driven, will give rise to vibrations of frequency F, in accordance with the formula $$F = \frac{R \times Np}{Np - Nr}$$

where R is the number of revolutions per minute of the driving shaft: Np is the number of lobes on the rotor 21: and Nr is the number of channels in the stator 20.

It should be understood that subject to the requirement of rolling, and substantial non-slip, relationship the rotor and stator of this invention may be modified, e.g. as regards the number of cooperating lobes and channels, without departing from the scope of the invention.

From the above description it will be seen that the invention provides a simple and convenient vibrator which is positive in operation, and it should be understood that the invention is not limited to details of the form described above, which may be modified, in order to meet various conditions and requirements encountered, without departing from the scope of the invention.

What we claim is:

1. A vibrator comprising a rotor in the form of a mass rotatable out-of-balance in a casing constituting a stator, wherein the said mass and casing, at rest and during relative movement maintain a cooperative engagement with one another by a plurality of ribs or lobes on one of them intermeshing with a different number of channels or recesses in the other, the surfaces of the said ribs or lobes being formed with smooth continuous curves of comparatively large radius of curvature, and the transverse dimensions of said mass and said casing, in their regions of cooperative engagement, being selected to ensure that throughout each complete relative gyration each of said ribs or lobes maintains, by a varying point of its surface, contact with the surface incorporating said channels or recesses.

2. A vibrator according to claim 1 wherein the channels or recesses are formed with smooth continuously curved surfaces of comparatively large radius of curvature.

3. A vibrator according to claim 1 wherein the ribs or lobes are formed on a part of the rotatable mass, and the channels or recesses formed in a part of the casing.

4. A vibrator according to claim 1 wherein the ribs or lobes are formed on a part of the casing, and the channels or recesses formed in a part of the rotatable mass.

5. A vibrator according to claim 1 wherein the ribs or lobes and the channels or recesses are located in the neighbourhood of one end of a cylindrical rotatable mass, and the corresponding adjacent area of the casing.

6. A vibrator according to claim 1 wherein the rotatable mass is provided with a universal coupling for connection to a driving member.

7. A vibrator according to claim 1 wherein said rotor comprises a main body portion and an end attachment formed externally with ribs or lobes, detachably secured to said body portion.

References Cited

UNITED STATES PATENTS

| | | | |
|---|---|---|---|
| 2,881,620 | 4/1959 | Nordegren | 259—1 XR |
| 3,283,598 | 11/1966 | Barnes | 259—1 XR |
| 3,296,874 | 1/1967 | Wyczalek | 259—1 XR |
| 3,340,742 | 9/1967 | Chandler | 259—1 XR |

ROBERT W. JENKINS, *Primary Examiner.*

J. M. BELL, *Assistant Examiner.*